(12) United States Patent
Kang et al.

(10) Patent No.: US 11,217,791 B2
(45) Date of Patent: Jan. 4, 2022

(54) SANDWICH-TYPE GRAPHENE COMPOSITE STRUCTURE FOR ANODE MATERIAL OF LITHIUM ION SECONDARY BATTERY AND MANUFACTURING METHOD THEREOF

(71) Applicant: DONGGUK UNIVERSITY INDUSTRY-ACADEMIC COOPERATION FOUNDATION, Seoul (KR)

(72) Inventors: Yongmook Kang, Seoul (KR); Daniel Adjei Agyeman, Seoul (KR); Kyeongse Song, Ansan-si (KR); Gihyeok Lee, Cheonan-si (KR)

(73) Assignee: DONGGUK UNIVERSITY INDUSTRY-ACADEMIC COOPERATION FOUNDATION

( * ) Notice: Subject to any disclaimer, the term of this patent is extended or adjusted under 35 U.S.C. 154(b) by 100 days.

(21) Appl. No.: 16/092,147

(22) PCT Filed: Mar. 22, 2017

(86) PCT No.: PCT/KR2017/003076
§ 371 (c)(1),
(2) Date: Oct. 8, 2018

(87) PCT Pub. No.: WO2017/183814
PCT Pub. Date: Oct. 26, 2017

(65) Prior Publication Data
US 2019/0157675 A1    May 23, 2019

(30) Foreign Application Priority Data

Apr. 20, 2016 (KR) .................. 10-2016-0048330

(51) Int. Cl.
*H01M 4/587* (2010.01)
*H01M 4/134* (2010.01)
(Continued)

(52) U.S. Cl.
CPC .............. *H01M 4/587* (2013.01); *C01B 33/02* (2013.01); *C09D 161/32* (2013.01);
(Continued)

(58) Field of Classification Search
CPC ...... H01M 4/583; H01M 4/587; H01M 4/471; H01M 4/133–134; H01M 4/1393–1395;
(Continued)

(56) References Cited

FOREIGN PATENT DOCUMENTS

KR    20140144590 A    12/2014

OTHER PUBLICATIONS

Fang, Chengcheng et al., "Improving the Electrochemical Performance of Si Nanoparticle Anode Material by Synergistic Strategies of Polydopamine and Graphene Oxide Coatings", The Journal of Physical Chemistry C 2015, 119, 1720-1728, American Chemistry Society 2015.

(Continued)

*Primary Examiner* — Helen Oi K Conley
(74) *Attorney, Agent, or Firm* — Renaissance IP Law Group LLP

(57) ABSTRACT

A sandwich-type graphene composite structure formed of carbon-coated silicon nanoparticles and graphene, and a method for manufacturing the same are provided. The sandwich-type graphene composite structure is formed of a carbon-coated silicon graphene through an environmentally friendly filtration process. The formed sandwich-type graphene composite structure relieves the volume expansion of the silicon. In addition, the carbon coated on the silicon surface improves electrical conductivity and may be used as a high-capacity anode material.

3 Claims, 5 Drawing Sheets

(51) Int. Cl.
| | |
|---|---|
| *H01M 10/0525* | (2010.01) |
| *C09D 161/32* | (2006.01) |
| *H01M 4/1395* | (2010.01) |
| *H01M 4/62* | (2006.01) |
| *H01M 4/04* | (2006.01) |
| *H01M 4/38* | (2006.01) |
| *C01B 33/02* | (2006.01) |
| *H01M 4/133* | (2010.01) |
| *H01M 4/36* | (2006.01) |
| *H01M 4/02* | (2006.01) |

(52) U.S. Cl.
CPC ......... *H01M 4/0471* (2013.01); *H01M 4/133* (2013.01); *H01M 4/134* (2013.01); *H01M 4/1395* (2013.01); *H01M 4/366* (2013.01); *H01M 4/386* (2013.01); *H01M 4/625* (2013.01); *H01M 10/0525* (2013.01); *H01M 2004/027* (2013.01)

(58) Field of Classification Search
CPC . H01M 4/139; H01M 4/36–366; H01M 4/386
See application file for complete search history.

(56) References Cited

OTHER PUBLICATIONS

Li, Hai et al., "A straightforward approach towards Si@C/graphene nanocomposite and its superior lithium storage performance", Electrochimica Acta 120 (2014) 96-101, Elsevier Ltd. 2013.

Sun, Fu et al., "A rationally designed composite of alternating strata of Si nanoparticles and graphene: a high-performance lithium-ion battery anode", Nanoscale, 2013, 5, 8586-8592, The Royal Society of Chemistry 2013.

Wang, Bin et al., "Adaptable Silicon-Carbon Nanocables Sandwiched between Reduced Graphene Oxide Sheets as Lithium Ion Battery Anodes", ACSNANO, vol. 7, No. 2, 1437-1445, 2013.

SANDWICH-TYPE GRAPHENE COMPOSITE STRUCTURE FOR ANODE MATERIAL OF LITHIUM ION SECONDARY BATTERY AND MANUFACTURING METHOD THEREOF

TECHNICAL FIELD

The present disclosure relates to a sandwich-type graphene composite structure for a negative electrode material and a method of manufacturing the same, and more particularly, to a sandwich-type composite structure formed of carbon-coated silicon and graphene through filtration, which is used as a negative electrode material, and a method of manufacturing the same.

BACKGROUND ART

When silicon is used as a negative electrode material for a lithium-ion battery, there are limits caused by a high volume expansion rate and a low electrical conductivity of silicon itself. To solve the above-mentioned problems of silicon, conventionally, attempts have been made to solve the problems by coating a silicon structure with a carbon-based material, and it has been reported that, when graphene is introduced, due to high mechanical properties of the graphene, a lifespan characteristic is improved. However, the introduction of graphene to silicon has many difficulties. When a solution process using graphene oxide is used, adhesion between silicon and graphene is difficult because of the difference in a surface property caused by hydrophobicity of a silicon surface and hydrophilicity of a graphene oxide surface. In addition, when graphene and silicon are mechanically mixed, they are easily detached or the uniformity of the mixture is reduced.

Due to such problems, for conventional techniques for introducing graphene to a silicon surface, complicated, expensive and non-eco-friendly methods were used. For example, Lou et al. (J. Phys. Chem. Lett. 3 (2012) 1824-1829) dispersed silicon particles on a graphene layer using an ultrasonic homogenizer, but the process was complicated and required high processing costs. In addition, according to a report by Ran Yi (Nano Energy 6 (2014) 211-218), a composite of graphene, carbon and silicon was prepared, but there was a problem of the use of a non-eco-friendly method with high processing costs, for example, chemical vapor deposition and hydrofluoric acid etching.

DISCLOSURE

Technical Problem

A first object to be attained by the present disclosure is to provide a sandwich-type graphene composite structure as a negative electrode material with high efficiency, prepared by an eco-friendly process.

A second object to be attained by the present disclosure is to provide a method of manufacturing the sandwich-type graphene composite structure as a negative electrode material for accomplishing the first object.

Technical Solution

In one aspect, the present disclosure provides a sandwich-type graphene composite structure, which includes: a first graphene oxide sheet layer; a silicon nanoparticle layer disposed on the first graphene oxide sheet layer; and a second graphene oxide sheet layer formed on the silicon nanoparticle layer.

In another aspect, the present disclosure provides a method of manufacturing a sandwich-type graphene composite structure, which includes: preparing a buffer solution containing dopamine hydrochloride; forming polydopamine-coated silicon nanoparticles by forming a first solution by mixing silicon nanoparticles in the buffer solution; forming a sandwich-type graphene composite structure by alternately filtering a second solution containing graphene oxide sheets and the first solution containing the polydopamine-coated silicon nanoparticles; and forming carbon-coated silicon nanoparticles by thermally treating the sandwich-type graphene composite structure, and inducing a chemical bond between the carbon-coated silicon nanoparticles and the graphene oxide sheets.

Advantageous Effects

According to a manufacturing method for preparing a sandwich-type composite of carbon-coated silicon nanoparticles and graphene according to the present disclosure, the electrical conductivity of silicon can be improved through carbonization of silicon by coating the surface of silicon nanoparticles with polydopamine.

In addition, the carbon-coated silicon nanoparticles prepared by forming a carbon layer to reduce the volume expansion of silicon can serve as an adhesive strongly adhered between the graphene layers using a hydrogen bond.

The graphene layers covering the silicon nanoparticles in a sandwich type can secondarily reduce the volume expansion of the silicon and improve the lifespan characteristic of a battery by preventing detachment of silicon from the composite structure.

In addition, to manufacture the sandwich-type composite structure with carbon-coated silicon and graphene, solution and filtration processes used are eco-friendly processes, and can have high economic feasibility by reducing processing costs.

However, the effects of the present disclosure are not limited to the above-mentioned effects, and effects other than the above-mentioned effects can be clearly understood by those of ordinary skill in the art from the following descriptions.

Figure 1:
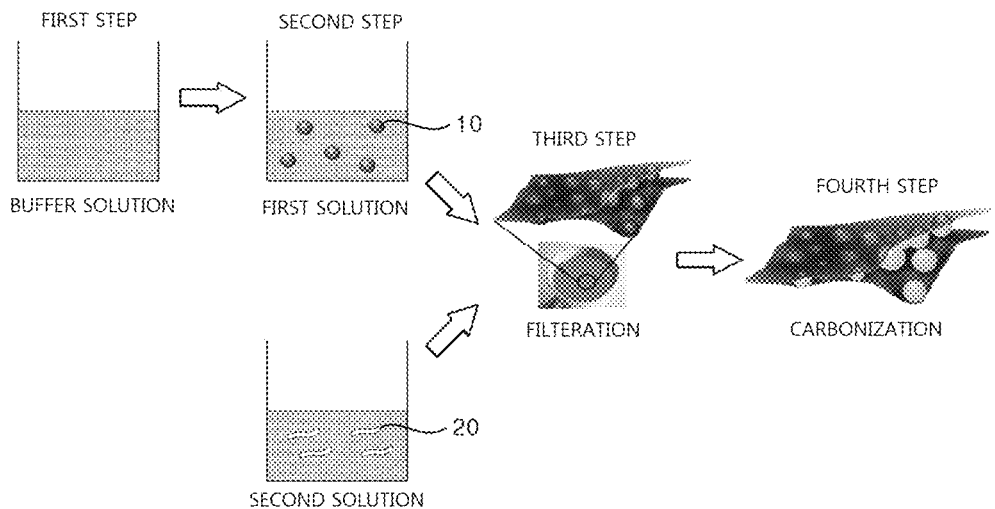
FIG. 1 is a diagram illustrating a method of manufacturing of a sandwich-type graphene composite structure according to an exemplary embodiment of the present disclosure.

Hereinafter, exemplary embodiments according to the present disclosure will be described in detail with reference to the accompanying drawings.

Embodiments of the present disclosure can be modified in a variety of different forms, and the scope of the present disclosure is not limited to the embodiments to be described below. In addition, the embodiments of the present disclosure are provided to more completely explain the present disclosure to those of ordinary skill in the art. Accordingly, the shape and size of components in the drawings may be exaggerated for more clear description, and like components are denoted by the like numerals in the drawings.

EXEMPLARY EMBODIMENTS

FIG. 1 is a diagram illustrating a method of manufacturing of a sandwich-type graphene composite structure according to an exemplary embodiment of the present disclosure.

Referring to FIG. 1, a method of manufacturing a sandwich-type graphene composite structure is illustrated.

First, a first solution is prepared by mixing silicon nanoparticles in a buffer solution. Therefore, polydopamine-coated silicon nanoparticles are formed in the first solution.

In addition, a second solution containing graphene oxide sheets is prepared.

Subsequently, a sandwich-type graphene composite structure is formed by alternately filtering the first and second solutions.

Finally, the sandwich-type graphene composite structure is thermally treated, and the silicon nanoparticle surface disposed in the sandwich-type graphene composite structure is coated with carbon. The carbon-coated silicon nanoparticles and the graphene oxide sheets are bonded by a chemical bond. The chemical bond may include hydrogen bonds.

The manufacturing method illustrated in FIG. 1 will be described in further detail below.

First, in Step 1, a buffer solution containing dopamine hydrochloride is prepared. The amount of the dopamine hydrochloride may be approximately 25 to 70 mg, and as the buffer solution, 80 mL of Tris-buffer having a pH 8.5 may be used.

In Step 2, a first solution is prepared by mixing silicon nanoparticles 10 in the buffer solution. The silicon nanoparticles 10 input to the buffer solution may have a size of 150 to 200 nm. When the silicon nanoparticles 10 are input to the buffer solution, the dopamine hydrochloride is polymerized on the surface of the silicon nanoparticle 10.

Accordingly, the surface of the silicon nanoparticle 10 is coated with polydopamine by a surface polymerization reaction. The time required for the surface polymerization reaction may be 12 to 48 hours. In addition, when the reaction time increases, a thickness of the polydopamine layer gradually increases, and thereby the thickness of the polydopamine layer may be controlled according to the reaction time In addition, a second solution containing graphene oxide sheets 20 is prepared, separate from Steps 1 and 2. A concentration of the second solution ranges from 1 to 10 mg/mL.

In Step 3, a sandwich-type graphene composite structure is formed by alternately filtering the second solution containing the graphene oxide sheets 20 and the first solution containing the polydopamine-coated silicon nanoparticles 10. The number of filtrations may be 2 to 4 cycles, and may be increased if needed.

In Step 4, carbon-coated silicon nanoparticles are formed by thermally treating the sandwich-type graphene composite structure formed in Step 3. Through the thermal treatment, chemical bonds are induced between the carbon-coated silicon nanoparticles and the graphene oxide sheets, and for example, the graphene oxide sheets and the carbon-coated silicon nanoparticles are bonded by hydrogen bonds.

The thermal treatment is a process of carbonizing polydopamine on the silicon surface by calcining in an argon/hydrogen-reducing atmosphere. The ratio of argon/hydrogen gases used in the thermal treatment may be 95:5 mL/hr to 90:10 mL/hr. In addition, a temperature-increasing rate during calcination may be 1° C./min to 5° C./min, and a time for temperature maintenance during calcination may be 1 to 4 hours.

Figure 2:
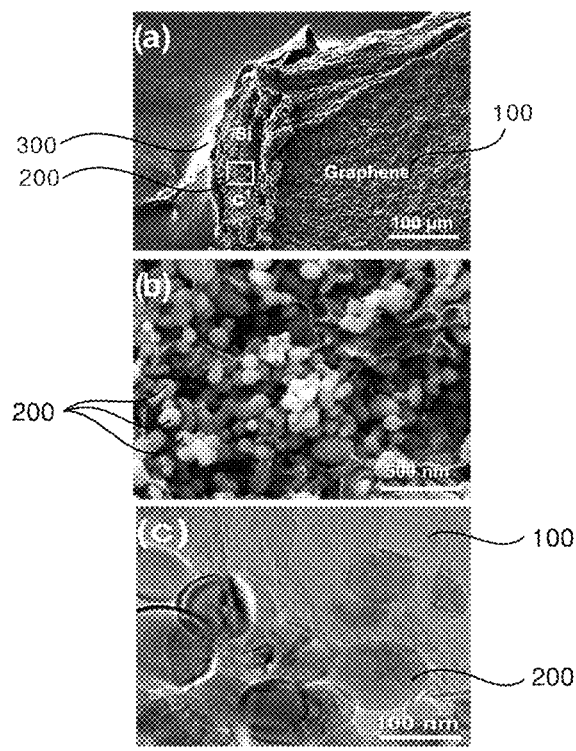
FIG. 2 is a set of images, which are analyzed using a transmission electron microscope, of a sandwich-type graphene composite structure according to an exemplary embodiment of the present disclosure.

FIG. 2 is a set of images, which are analyzed using a transmission electron microscope, of a sandwich-type graphene composite structure according to an exemplary embodiment of the present disclosure.

FIG. 2 shows images, analyzed using a transmission electron microscope, of the sandwich-type graphene composite structure. In FIG. 2, FIG. 2(A) shows an overall sandwich-type graphene composite structure. In addition, FIG. 2(B) is an enlarged image of the carbon-coated silicon nanoparticles of FIG. 2(A), and FIG. 2(C) is a transmission microscope image of the enlarged nanoparticles of FIG. 2(B).

The sandwich-type graphene composite structure has a first graphene oxide sheet layer 100, silicon nanoparticles 200 and a second graphene oxide sheet layer 300. The silicon nanoparticles 200 have a structure in which a particle surface is coated with carbon atoms, and chemical bonds are made between the silicon nanoparticles 200 and the graphene oxide sheet layers 100 and 300 disposed at upper and lower parts of the nanoparticles.

In other words, the first graphene oxide sheet layer 100 and the second graphene oxide sheet layer 300 are disposed at the upper and lower parts of the silicon nanoparticles 200, and a graphene composite structure having a multilayer structure may be obtained according to the selection of the number of alternating filtering processes for the first and second solutions in Step 3 disclosed in FIG. 1.

In FIG. 2(A), it can be confirmed that the first graphene oxide sheet layer 100 and the second graphene oxide sheet layer 300 overlap each other, and the presence of the carbon-coated silicon nanoparticles between the two graphene oxide sheet layers 100 and 300 can be confirmed.

In addition, in FIGS. 2(B) and 2(C), it can be confirmed that the carbon-coated silicon nanoparticles 200 are distributed on the first graphene oxide sheet layer 100.

Figure 3:
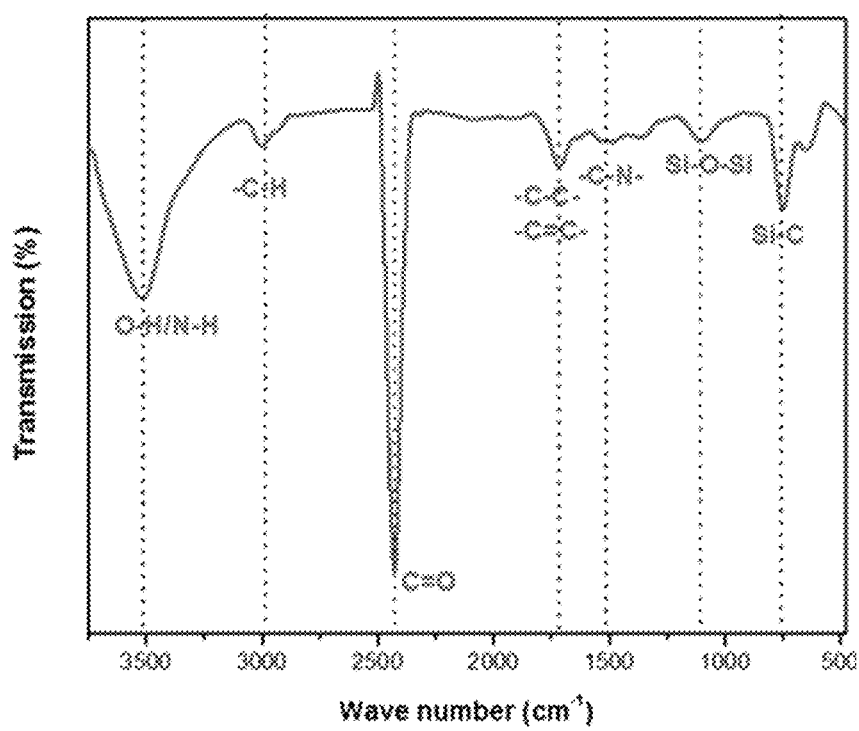
FIG. 3 is an infrared spectroscopy graph for a sandwich-type graphene composite structure according to an exemplary embodiment of the present disclosure.

FIG. 3 is an infrared spectroscopy graph for a sandwich-type graphene composite structure according to an exemplary embodiment of the present disclosure.

Referring to FIG. 3, infrared spectroscopy is performed to analyze a chemical bond in the sandwich-type graphene composite structure of the present disclosure.

In infrared spectroscopy, peaks of N—H and O—H functional groups are detected, and it is determined that an N—H bond is formed by a hydrogen bond of nitrogen atoms constituting polydopamine, which remain on the surface of silicon nanoparticles in the thermal treatment process for the silicon nanoparticles. In addition, the peak of the O—H functional group shows a pattern of forming a hydrogen bond between oxygen atoms formed on the graphene oxide sheet layer. Therefore, it can be seen that the nitrogen atoms remaining on the silicon nanoparticle surface and the oxygen atoms on the graphene oxide sheet layer have a strong binding strength by means of a hydrogen bond.

In addition, in FIG. 3, a Si—C peak indicates that the silicon nanoparticle surface is bonded or coated with carbon atoms by a strong covalent bond. Besides the Si—C peak, a C—H peak indicates that carbon atoms are bonded to the silicon nanoparticles by hydrogen bonds. Accordingly, by means of the hydrogen bonds, the silicon nanoparticles and the graphene oxide sheet layers may maintain a strong binding strength.

Figure 4:
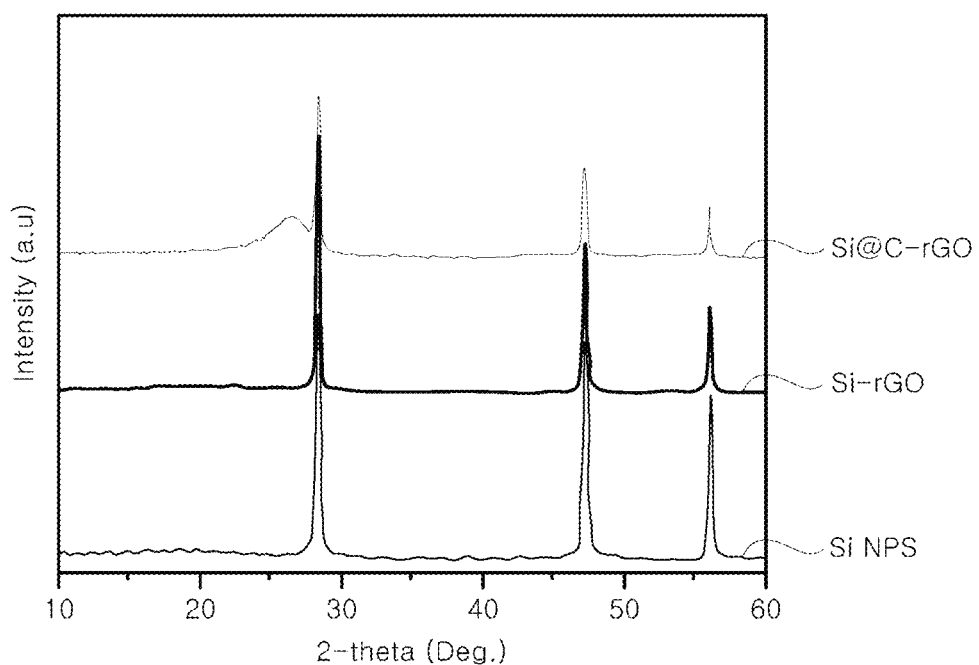
FIG. 4 is an X-ray diffraction analysis graph for silicon nanoparticles, a composite of silicon and graphene and a sandwich-type graphene composite structure according to an exemplary embodiment of the present disclosure.

FIG. 4 is an X-ray diffraction analysis graph for silicon nanoparticles, a composite of silicon and graphene and a sandwich-type graphene composite structure according to an exemplary embodiment of the present disclosure.

Referring to FIG. 4, the result of X-ray diffraction analysis for silicon nanoparticles, a composite of silicon and graphene and a sandwich-type graphene composite structure according to the present disclosure is shown.

Si NPs in FIG. 4 represents silicon nanoparticles. In addition, Si-rGO in FIG. 4 indicates that silicon nanoparticles which are not coated with carbon are bonded with graphene oxide. In addition, Si@C-rGO in FIG. 4 represents the result of analyzing a sample in which carbon-coated silicon nanoparticles are disposed between graphene layers in a sandwich-type according to an exemplary embodiment of the present disclosure.

According to the X-ray diffraction analysis, silicon peaks can be observed at 28°, 48° and 57°. In the case of Si-rGO in FIG. 4 representing a composite of silicon and graphene which is not coated with carbon, no peak of reduced graphene oxide can be observed at 25° to 27° whereas Si@C-rGO according to this exemplary embodiment shows the peak. In other words, no peak of simultaneously reduced graphene oxide was observed. It is considered that silicon is detached from graphene.

Therefore, the sandwich-type graphene composite structure of the exemplary embodiment serves to prevent detachment of silicon from graphene because polydopamine is carbonated by heat to coat the surface of silicon particles with carbon.

Figure 5:
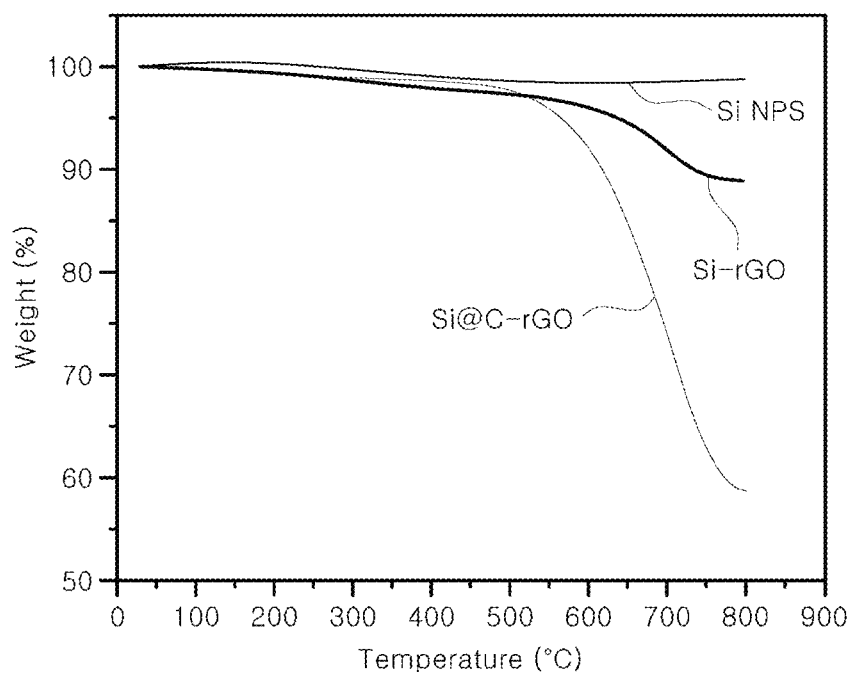
FIG. 5 is a thermogravimetric analysis graph for silicon nanoparticles, a composite of silicon and graphene and a sandwich-type graphene composite structure according to an exemplary embodiment of the present disclosure.

FIG. 5 is a thermogravimetric analysis graph for silicon nanoparticles, a composite of silicon and graphene and a sandwich-type graphene composite structure according to an exemplary embodiment of the present disclosure.

Referring to FIG. 5, through the thermogravimetric analysis for the sandwich-type graphene composite structure, the silicon content in the composite is measured. The thermogravimetric analysis is performed in air, and due to degradation of carbon from approximately 500° C., a weight is reduced and finally a residual content of silicon can be confirmed. It can be confirmed that approximately 60 wt % of silicon is contained in the silicon sandwich-type composite structure.

Figure 6:
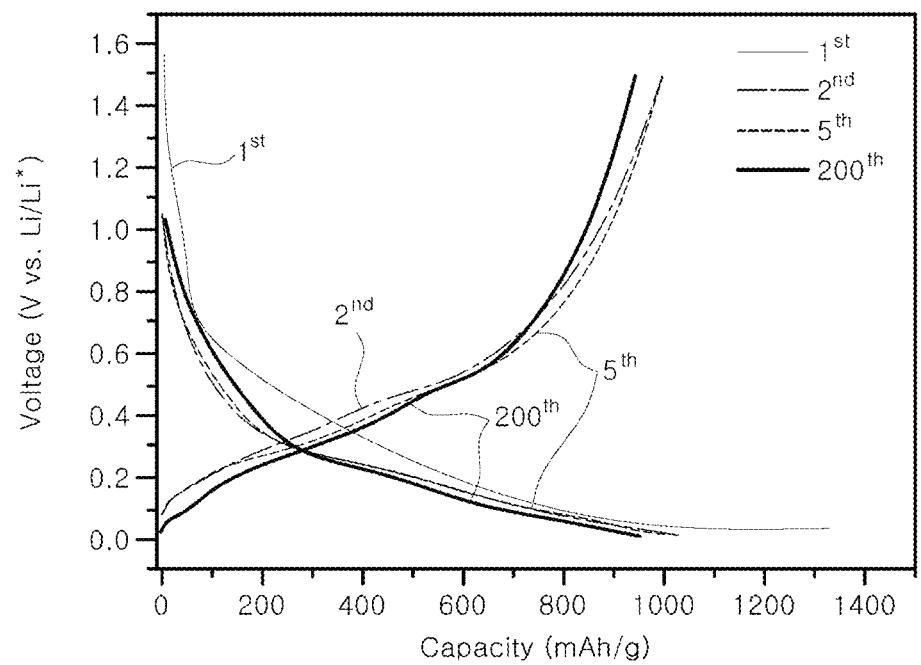
FIG. 6 is a graph of the capacity analyzed with respect to the electrochemical voltage of a sandwich-type graphene composite structure according to an exemplary embodiment of the present disclosure.
Figure 7A:
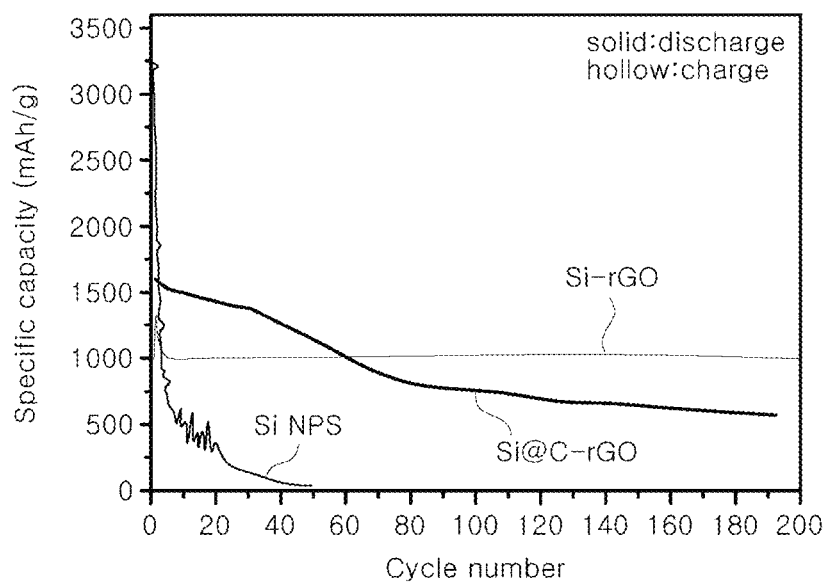
FIG. 7A and FIG. 7B are a set of graphs showing the capacity and lifespan characteristics of silicon nanoparticles, a composite of silicon and graphene and a sandwich-type graphene composite structure according to an exemplary embodiment of the present disclosure.
Figure 7B:
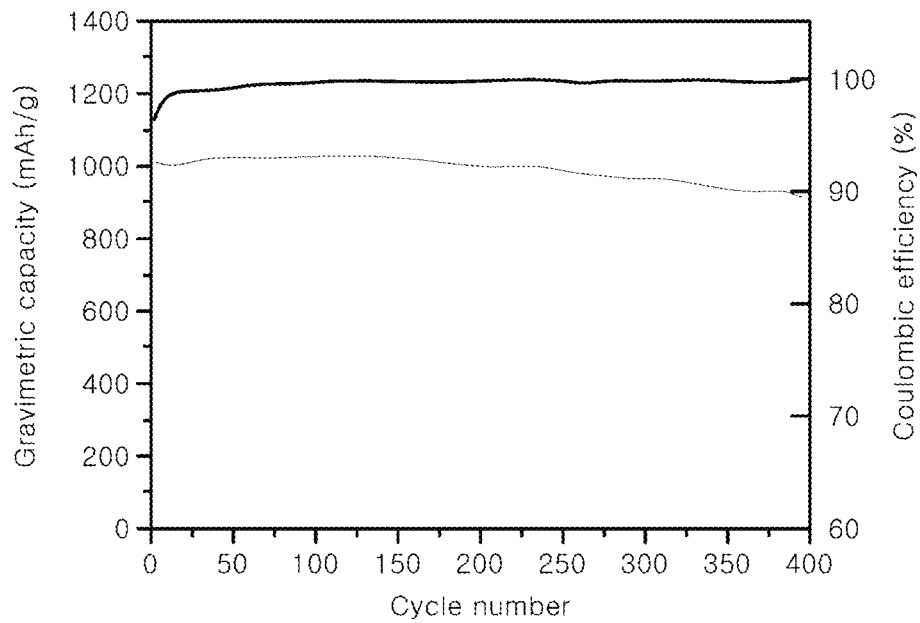
Figure 8:
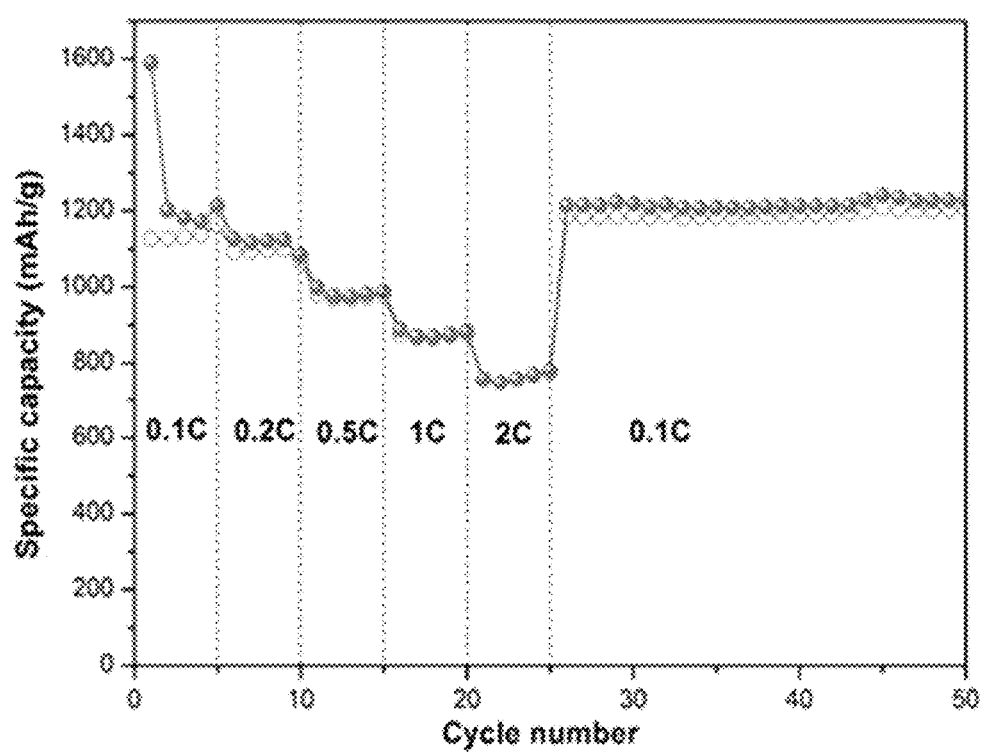
FIG. 8 is a graph illustrating the comparison of rate-determining characteristics of a sandwich-type graphene composite structure according to an exemplary embodiment of the present disclosure.

FIGS. 6 to 8 are graphs showing the analysis results of electrochemical performance.

To analyze the electrochemical performance of the sandwich-type graphene composite structure of the present disclosure, a cell may be assembled as follows. The cell may consist of a casting top, a gasket, a dry spring, a stainless steel spacer, a reference Li electrode, a separator, electrodes of a composite structure, and a casing bottom. In the cell, the casting top, the bottom, the spring and the spacer may include stainless steel, the gasket may include plastic, and the separator may include polypropylene. In addition, an electrolyte containing 5% FEC in 1.3M $LiPF_6$ (in EC:DEC (1:1)) is used.

The performance analysis was performed at a current density of 0.1 C, 0.2 C, 0.5 C, 1 C or 2 C based on 1500 mAh/g per 1 C.

FIG. 6 is a graph illustrating a change in capacity according to voltage. The voltage ranges from 0V to 1.6V, and charging and discharging are repeated 1, 2, 5 or 200 cycles. As a result of 1 to 200 cycles of charging and discharging and applying various voltages, a capacity is maintained at 300 mAh/g to 400 mAh/g.

FIG. 7A and FIG. 7B are a set of graphs showing a lifespan and charging/discharging efficiency, respectively.

First, FIG. 7A shows the lifespan of a secondary battery. In FIG. 7A, the Y axis represents a specific capacity (mAh/g), and the X axis represents the number of charging and discharging cycles, that is, the lifespan of a cell. In the case of the silicon particles of Si NPs in FIG. 7A, the initial capacity is 3000 mAh/g, the capacity is greatly reduced to 500 mAh/g at 10 cycles of charging and discharging, and reaches 0 mAh/g after 50 cycles of charging and discharging. While the theoretical capacity of silicon itself is high, since the volume of the silicon increases due to repetition of charging/discharging, a battery lifespan rapidly decreases. Therefore, it is difficult to use silicon alone as a negative electrode material.

Si-rGO in FIG. 7A is prepared by binding silicon with graphene oxide. In this case, the capacity is also reduced from 1 to 60 cycles of charging and discharging. In addition, after 180 cycles of charging and discharging, the initial capacity is reduced by 50% or more. It is considered that the silicon and the graphene oxide are detached from each other as charging/discharging is repeated due to the difference in a surface property between the silicon surface (hydrophobic) and the graphene oxide surface (hydrophilic).

Si@C-rGO in FIG. 7 of the present disclosure is prepared by disposing carbon-coated silicon nanoparticles between graphene oxide sheet layers in a sandwich type, resulting in a sandwich-type graphene composite structure. It can be seen that the two-cycle charging and discharging capacity of the sandwich-type graphene composite, that is, 1000 mAh/g, is maintained until 200 cycles of charging and discharging. Therefore, the above-mentioned capacity is higher than the theoretical capacity of graphene, that is, 372 mAh/g, and it can be confirmed that the carbon and graphene of the sandwich-type composite structure serve to reduce the volume expansion of silicon, and a high lifespan characteristic in which the capacity of 1000 mAh/g is maintained until 200 cycles of charging and discharging is exhibited.

In addition, FIG. 7B illustrates the lifespan and charging/discharging efficiency of Si@C-rGO of the present disclosure. Referring to FIG. 7B, it can be seen that a secondary battery in which the sandwich-type graphene composite structure of the present disclosure is introduced as a negative electrode material has no significant change in specific capacity even at 400 cycles of charging and discharging.

This can be also explained by a change in gravimetric capacity. In addition, it can be seen that the secondary battery to which the Si@C-rGO of the present disclosure is applied maintains a charging/discharging efficiency of approximately 99% even at 400 cycles of charging and discharging.

In other words, according to this exemplary embodiment, to prevent the volume expansion of silicon according to the repetition of charging and discharging and the detachment of silicon from graphene, the carbon-coated silicon nanoparticles are disposed between the graphene oxide sheet layers in a sandwich type. Therefore, the volume expansion and detachment in the negative electrode of the secondary battery may be reduced.

FIG. 8 is a graph illustrating the comparison of rate-determining characteristics of a sandwich-type graphene composite structure according to an exemplary embodiment of the present disclosure.

FIG. 8 is a graph illustrating the comparison of rate-determining characteristics of the sandwich-type composite structure.

The performance is analyzed at a current density of 0.1 C, 0.2 C, 0.5 C, 1 C or 2 C based on 1500 mAh/g per 1 C. As a result, it can be confirmed that electrical conductivity is improved by coating silicon with carbon, and a capacity of approximately 70% is conserved at a high current density of 2 C.

Therefore, through an eco-friendly filtration process, carbon-coated silicon and graphene are formed in a sandwich-type graphene composite structure, and the formed sandwich-type graphene composite structure may be utilized as a high-capacity negative electrode material by reducing the volume expansion of silicon, and coating a silicon surface with carbon to improve electrical conductivity.

As described above, in the present disclosure, a sandwich-type graphene composite structure in which carbon-coated silicon nanoparticles are introduced between graphene oxide sheet layers is disclosed. Accordingly, the silicon nanoparticles make hydrogen bonds with graphene oxide sheet layers, and electrochemical stability can be attained by coupling of the silicon nanoparticles with graphene oxide sheet layers using hydrogen bonds.

In addition, the sandwich-type graphene composite structure manufactured according to the present disclosure may be entirely coated with carbon. In other words, a carbon thin film may be formed on the sandwich-type graphene composite structure of the present disclosure by coating such as pitch, etc., and thereby a detaching phenomenon of the silicon nanoparticles may be further prevented.

The invention claimed is:

1. A graphene composite structure, comprising:
a first graphene oxide sheet layer;
a silicon nanoparticle layer disposed on the first graphene oxide sheet layer; and
a second graphene oxide sheet layer formed on the silicon nanoparticle layer,
wherein a surface of the silicon nanoparticle layer is coated with carbon, and nitrogen atoms remaining on the surface of the silicon nanoparticle layer and oxygen atoms on the first graphene oxide sheet layer and the second graphene oxide sheet layer are bonded by hydrogen bonds, the hydrogen bonds comprising N—H and O—H functional groups,
and wherein the graphene composite structure has a Si—C peak in an infrared spectroscopy graph, and the surface of the silicon nanoparticles forms a covalent bond with carbon.

2. The composite structure according to claim 1, wherein an additional silicon nanoparticle layer and graphene oxide sheet layer are alternately stacked on the second graphene oxide sheet layer.

3. The composite structure according to claim 1, wherein the first graphene oxide sheet layer and the second graphene oxide sheet layer are bonded with the silicon nanoparticle layer using the hydrogen bonds.

* * * * *